US012712640B2

(12) United States Patent
Marsella et al.

(10) Patent No.: US 12,712,640 B2
(45) Date of Patent: Aug. 18, 2026

(54) PERTURBATION BASED HARD DECISION NONLINEARITY COMPENSATION

(71) Applicant: Nokia Solutions and Networks OY, Espoo (FI)

(72) Inventors: Domenico Marsella, Villasanta (IT); Andrea Carnio, Ronco Briantino (IT); Luca Gabriele Razzetti, Sesto San Giovanni (IT); Carlo Costantini, Casatenovo (IT); Giancarlo Gavioli, Usmate Velate (IT)

(73) Assignee: Nokia Solutions and Networks Oy, Espoo (FI)

(*) Notice: Subject to any disclaimer, the term of this patent is extended or adjusted under 35 U.S.C. 154(b) by 261 days.

(21) Appl. No.: 18/421,898

(22) Filed: Jan. 24, 2024

(65) Prior Publication Data

US 2024/0259109 A1 Aug. 1, 2024

(30) Foreign Application Priority Data

Jan. 26, 2023 (EP) .................................... 23153449

(51) Int. Cl.
*H04B 10/60* (2013.01)
*H04B 10/61* (2013.01)
*H04B 10/69* (2013.01)

(52) U.S. Cl.
CPC ....... *H04B 10/6163* (2013.01); *H04B 10/695* (2013.01); *H04B 10/60* (2013.01); *H04B 10/61* (2013.01); *H04B 10/616* (2013.01)

(58) Field of Classification Search
CPC .. H04B 10/6163; H04B 10/695; H04B 10/60; H04B 10/61; H04B 10/616; H04L 25/061
(Continued)

(56) References Cited

U.S. PATENT DOCUMENTS 10,756,822 B1 8/2020 Marsella et al.
2013/0077979 A1* 3/2013 Dou .................. H04B 10/2543 398/192

(Continued)

FOREIGN PATENT DOCUMENTS

EP 3 157 180 A1 4/2017
EP 3 352 387 B1 2/2021

OTHER PUBLICATIONS

Edson et al., Perturbation-Based FEC-Assisted Iterative Nonlinearity Compensation for WDM Systems, Feb. 2019, JOLWT, All Document. (Year: 2019).*
Edson et al., FEC-assisted Nonlinearity Compensation for Coherent Optical Receivers, Jun. 2021, SBFoton IOPC, All Document. (Year: 2021).*

(Continued)

*Primary Examiner* — Dibson J Sanchez
(74) *Attorney, Agent, or Firm* — Brake Hughes Bellermann LLP

(57) ABSTRACT

A method and apparatus are provided for compensating incoming signals in a receiver of an optical fiber communication system for degradation due to nonlinear optical effects in the transmission channel. The compensation is performed, inter alia, in circuitry to compute perturbation terms that are representative of predicted optical nonlinearity of the transmission channel, and circuitry to combine the perturbation terms with soft data symbols obtained from an input signal stream. The computation of the perturbation terms involves circuitry for converting an input stream of soft data symbols to an input stream of hard data symbols, and then operating on the input stream of hard data symbols according to a model of nonlinear effects in the transmission channel.

12 Claims, 9 Drawing Sheets

(58) Field of Classification Search
USPC .................................................. 398/202–214
See application file for complete search history.

(56) References Cited

U.S. PATENT DOCUMENTS

2013/0188948 A1* 7/2013 Dou .................. H04B 10/2543 398/28
2013/0243433 A1* 9/2013 Yan .................. H04B 10/2543 398/65
2015/0071630 A1* 3/2015 Oyama ............. H04B 10/2543 398/208
2015/0071652 A1 3/2015 Zhuge et al.
2015/0295643 A1* 10/2015 Zhao ................. H04B 10/0795 398/29
2016/0294480 A1* 10/2016 Mertz ............... H04B 10/6163
2019/0013866 A1* 1/2019 Irie .................... H04B 10/2939
2023/0085546 A1* 3/2023 Osman ................. H04L 27/368 398/208

OTHER PUBLICATIONS

Ip, Ezra, and Joseph M. Kahn. “Compensation of dispersion and nonlinear impairments using digital backpropagation.” Journal of Lightwave Technology 26.20 (2008): 3416-3425.
Tao, Zhenning, et al. “Multiplier-free intrachannel nonlinearity compensating algorithm operating at symbol rate.” Journal of Lightwave Technology 29.17 (2011): 2570-2576.
Ronen Dar, Meir Feder, Antonio Mecozzi, and Mark Shtaif, “Inter-Channel Nonlinear Interference Noise in WDM Systems: Modeling and Mitigation,” J. Lightwave Technol. 33, 1044-1053 (2015).
A. Ghazisaeidi and R. Essiambre, “Calculation of coefficients of perturbative nonlinear pre-compensation for Nyquist pulses,” 2014 The European Conference on Optical Communication (ECOC), Cannes, 2014, pp. 1-3.
W. Peng, Z. Li, F. Zhu, and Y. Bai, “Training-based Determination of Perturbation Coefficients for Fiber Nonlinearity Mitigation,” in Optical Fiber Communication Conference, OSA Technical Mar. 2015 /D.S./.

* cited by examiner 170
175
DEMUX
180.1
180.2
180.n
OPTICAL FRONT-END
185.1
185.2
185.n
ADC
LINEAR EQUALIZER
DEMODULATOR
NONLINEARITY EQUALIZATION
DECODER

PERTURBATION BASED HARD DECISION NONLINEARITY COMPENSATION

CROSS-REFERENCE TO RELATED APPLICATION

This application claims priority to European Patent Application EP 23153449.6, filed in the European Patent Office on Jan. 26, 2023.

FIELD OF THE INVENTION

The invention relates to devices and methods for use in coherent optical communication.

ART BACKGROUND

This section introduces aspects that may help facilitate a better understanding of the inventions. Accordingly, the statements of this section are to be read in that light, and they should not be understood as admissions about what is prior art or what is not prior art.

In optical fiber communication systems, linear and nonlinear optical effects can degrade the optical signals and thereby limit system performance. Some optical fiber communication systems use digital signal processors (DSPs) to at least partially compensate for signal degradation that is due to linear impairments of the optical channel.

Digital compensation of signal degradation that arises from nonlinear optical effects, particularly from fiber nonlinearities, may also be useful for improving the performance of an optical fiber communication system. One potential benefit of fiber nonlinearity compensation (NLC) is that in an optical fiber communication system, such compensation could diminish the need for optical signal regeneration between a source optical data transmitter and a target optical data receiver.

Several techniques of digital compensation have been proposed to minimize or mitigate channel nonlinearities. It has been challenging for developers in this field to overcome the computational complexity of this problem. In the past few years, many algorithms have been proposed with the goal of minimizing the number of signal processing operations needed to equalize nonlinearity from the received signal. Some of these algorithms have substantially reduced the computational complexity.

One approach that shows promise for practical implementation in a coherent optical data receiver is the Perturbation-based Nonlinearity Compensator (PNC). Implementations of this approach involve calculating perturbation terms associated with intra-channel fiber nonlinearities and then subtracting them from the received signal.

For example, an efficient implementation of PNC was proposed in European Patent Application No. 15306613.9, published Apr. 19, 2017 as EP 3,157,180 A1. The entirety of EP 3,157,180 A1 is hereby incorporated herein by reference. As proposed there, the nonlinear channel response is computed using a combination of linear filters operating over a number of interacting symbols.

Another implementation of PNC was proposed in U.S. Pat. No. 10,756,822, issued Aug. 25, 2020. The entirety of U.S. Pat. No. 10,756,822 is hereby incorporated herein by reference. The approach proposed there is based on a recognition that some contributions to the nonlinear optical effects have a much lower frequency content than the digital data symbol rate. For those contributions, low-frequency approximations are used to reduce the overall complexity of the computation.

Despite significant advances, however, PNC may still be unduly complex for implementation in the DSPs of at least some coherent optical fiber communication systems. Thus, there is still a need for even simpler circuits that can be implemented in an ASIC for a practical high-speed DSP.

SUMMARY OF THE INVENTION

We have developed a new scheme for implementing PNC in a coherent optical fiber communication system. Our new scheme, which we refer to as "Hard-Decision PNC", is based on the processing of hard symbols after decision instead of the processing of received soft symbols. Thanks to this innovation, the computational cost of calculating the nonlinear perturbations in the PNC can be significantly reduced. There may be a small performance penalty due to decision errors, depending on the particular application scenario. However, this penalty can be overcome by performing Hard-Decision PNC in multiple stages, in which the decision on the symbols is taken at the beginning of each stage. The reliability of the decisions can gradually improve, stage-by-stage.

More specifically, possible corruptions in data symbols received on an input stream are corrected in PNC by additively combining the received data symbols with perturbation terms. The perturbation terms are computed from the received input stream together with system parameters. In known implementations, the corrections are performed on soft symbols, using perturbation terms that are also computed from the soft symbols that have been received.

In this regard, a "soft symbol" is a point in the complex plane that corresponds to a constellation symbol as received from the incoming optical channel after linear equalization. As such it is may be affected by noise, and may consequently deviate from the precise point in the complex plane where the original constellation symbol is located.

A soft symbol may be corrupted, because it bears the effects of fiber nonlinearity and noise, among other factors. Consequently, a soft symbol will not generally coincide precisely in value with a symbol from the constellation used for transmission.

The mapping of a soft symbol to a constellation symbol, resulting in the output of a "hard symbol", is performed by a hard decision processor. The range of possible values for a soft symbol is much greater than the range for hard symbols, which is limited to the discrete constellation points. In general, therefore, it takes significantly more bits to represent a soft symbol with sufficient precision than it does to represent a hard symbol.

In our new scheme, the perturbation terms are computed from hard symbols, rather than soft symbols. Because it takes fewer bits to represent a hard symbol, we are able to reduce the complexity of the computation.

As noted above, a hard decision implemented prior to computing the perturbation terms can possibly introduce decision errors that can degrade the performance of the receiver. As also noted above, we believe that a multistage approach can overcome this drawback. In the first stage of the multistage approach, the incoming soft symbols are subjected to a hard decision, perturbation terms are computed from the resulting hard symbols and from a first subset of nonlinearity contributions, and the computed perturbation terms are used to compute new soft symbols.

In each succeeding stage, a new set of perturbation terms are computed as above, but using a subset of nonlinearity contributions that is independent of the subsets used in the preceding stage or stages. By "independent" subsets, we mean subsets that have no elements in common. The perturbation calculation becomes progressively more refined as it advances through the multiple stages.

Accordingly, the disclosure relates in one aspect to a method that may be carried out in each of one or more stages in a digital signal processor for a coherent optical receiver. The method comprises obtaining an input stream of soft data symbols, generating a stream of perturbation terms that are representative of optical nonlinearity of an optical transmission channel, and using the perturbation terms to compensate respective ones of the soft data symbols in the input stream of soft data symbols for the optical nonlinearity.

For generating of the stream of perturbation terms, the input stream of soft data symbols is converted to an input stream of hard data symbols, and the method operates on the input stream of hard data symbols to produce the perturbation terms. The operating on the input stream of hard data symbols comprises forming weight coefficients. For each of the perturbation terms, the operating on the input stream of hard data symbols also comprises forming a weighted sum of the hard data symbols using the weight coefficients.

The input stream of soft data symbols of a first of the one or more stages is produced from a stream of measurements of an optical signal received by the optical receiver.

In embodiments, the using of the perturbation terms for compensation comprises subtracting the perturbation terms from respective ones of the soft data symbols to generate the compensated ones of the soft data symbols.

In embodiments, the method is performed in a series of the stages. In each stage after the first of the series, the obtaining of an input stream of soft data symbols comprises obtaining the compensated soft data symbols generated by the preceding stage of the series.

In embodiments further to any of those described above, each weight coefficient is formed, at least in part, by performing a convolution between a set of channel coefficients and a set of multiplicative products of hard data symbols, wherein the channel coefficients are complex numbers that characterize nonlinear effects in the optical transmission channel. Each respective convolution may be performed numerically in the time domain. Alternatively, each convolution may correspond to a respective linear filter, and each respective convolution may be performed numerically by evaluating the corresponding linear filter in the frequency domain.

In embodiments further to any of those described above, the method is performed in a series of two or more stages. In each stage, in generating each perturbation term, there is formed a weighted sum of a set of N terms from the input stream of hard data symbols respective to that stage, N being a predetermined positive integer. The respective sets of N terms used in the different stages are independent of each other.

In embodiments further to any of those described above, an ultimate of the one or more stages directs a stream of the compensated soft data symbols to a decoder, and the directed stream is decoded in the decoder.

In embodiments, the using of the perturbation terms to compensate soft data symbols comprises advancing at least some of the perturbation terms to a soft-decision FEC decoder; and in the FEC decoder, using the advanced perturbation terms to perform soft-decision compensation of at least some of the soft data symbols.

The disclosure relates in a second aspect to apparatus comprising a digital signal processor that comprises one or more PNC stages to perform perturbation-based optical nonlinearity compensation of measurements of an optical data signal in an optical receiver. Each PNC stage comprises a circuit configured to convert a stream of soft data symbols to a stream of hard data symbols. Each PNC stage further comprises a PNC circuit configured to generate a stream of perturbation terms from the hard data symbols. Each PNC circuit is configured to generate each individual one of the perturbation terms as a weighted sum of the hard data symbols. The digital signal processor further comprises at least one circuit configured to compensate individual ones of the soft data symbols using corresponding ones of the perturbation terms.

In embodiments, the digital signal processor comprises a series of the PNC stages, each of which is configured to subtract individual perturbation terms from respective soft data symbols to generate corrected soft data symbols. The PNC circuit in each PNC stage except a last PNC stage of the series is configured to output the corrected soft data symbols therefrom to a next PNC stage of the series. The PNC circuit of the last PNC stage of the series is configured to output the corrected soft data symbols therefrom to a decoder.

In embodiments of the apparatus further to any of those described above, the PNC circuit in each PNC stage is conformed to perform a convolution between a set of channel coefficients and a set of multiplicative products of hard data symbols to generate weight coefficients, wherein the channel coefficients represent nonlinear effects in the optical transmission channel. In some embodiments, the PNC circuit in each PNC stage may be conformed to perform the convolution numerically by evaluating a corresponding linear filter in the frequency domain.

In embodiments of the apparatus further to any of those described above, the digital signal processor comprises a series of two or more of the PNC stages. The PNC circuit in each PNC stage is configured to form each of its respective weighted sums from a set of N terms selected from a stream of hard data symbols, N being a predetermined positive integer, wherein the sets of N terms used by the respective PNC stages are independent of each other.

In embodiments, the digital signal processor further comprises a soft-decision FEC decoder. The PNC circuit of a last of the one or more PNC stages is configured to output a stream of soft data symbols and a stream of perturbation terms to the soft-decision FEC decoder. The soft-decision FEC decoder is configured to use the outputted perturbation terms to perform soft-decision compensation of the outputted soft data symbols.

DETAILED DESCRIPTION

This Detailed Description and its accompanying drawings are intended merely to illustrate principles of the inventions. Based on the present specification, those of ordinary skill in the relevant art will be able to devise various arrangements that, although not explicitly described or shown herein, embody the inventions and are included within the scope of the claims. Also, statements herein reciting principles, aspects, and embodiments are intended to encompass equivalents thereof.

Figure 1:
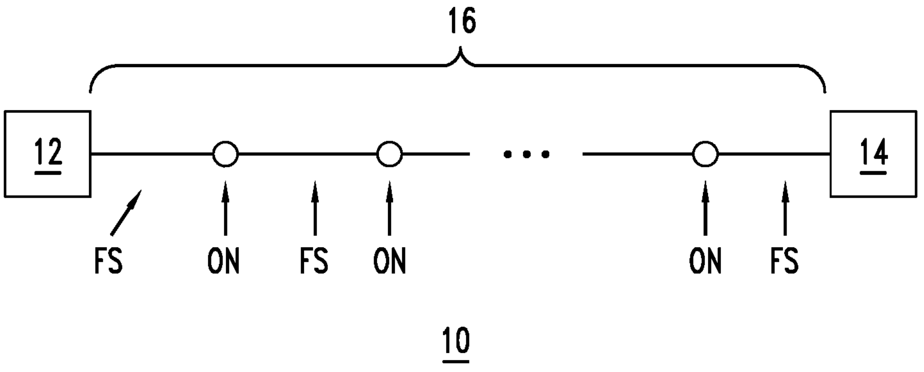
FIG. 1 schematically illustrates an optical fiber communication system.

FIG. 1 illustrates an optical fiber communication system 10, which includes an optical data transmitter 12, an optical data receiver 14, and an optical fiber line 16. The optical fiber line 16 forms an all-optical communication channel between the optical data transmitter 12 and the optical data receiver 14. The optical fiber line 16 has one or more optical fiber spans, exemplarily single-mode optical fiber spans (FS) as indicated in the figure, which are all-optically connected at optical nodes (ON). Optical data transmitter 12, or optical data receiver 14, or each of transmitter 12 and receiver 14 includes a digital signal processor (DSP), which is configured to evaluate corrections to the transmitted optical signals and, at least in part, to digitally correct for intra-channel and/or inter channel signal degradations due to nonlinear optical effects in the optical fiber line 16.

Figure 2:
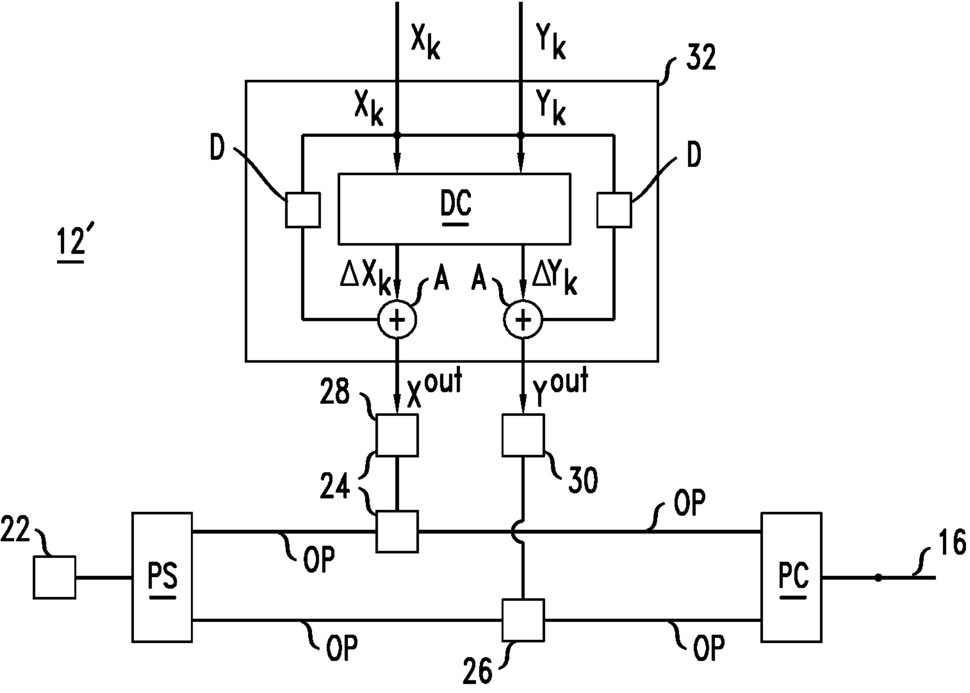
FIG. 2 is a block diagram illustrating a coherent optical data transmitter that digitally implements some pre-compensation of nonlinear optical effects in a DSP thereof.

FIG. 2 illustrates an example embodiment 12' of the optical data transmitter 12 of FIG. 1. As illustrated, transmitter 12' is configured to impose respective data modulations onto each of two orthogonal polarizations of an optical carrier, which are conventionally referred to as x-polarization and y-polarization, respectively. Transmitter 12' may also, at least in part, digitally pre-compensate the optical signal for nonlinear optical effects arising, e.g., in the optical fiber line 16 of FIG. 1.

Optical data transmitter 12' may transmit independent signals on each of a multiplicity of optical carriers having different wavelengths. In other words, optical data transmitter 12' may transmit in multiple wavelength channels. For simplicity of presentation, however, optical data transmitter 12' is described here without explicit reference to more than a single wavelength channel.

As illustrated, optical data transmitter 12' includes optical source 22; first and second optical data modulators 24, 26, respectively; electrical drivers 28, 30 for the optical data modulators 24, 26; and digital signal processor (DSP) 32.

Optical source 22 will typically be a narrow-bandwidth telecommunication laser. As illustrated, an optical wavelength carrier from optical source 22 is directed as input to optical polarization splitter PS. The two outputs of splitter PS, which have mutually orthogonal polarizations, are input by way of optical paths OP to respective optical data modulators 24, 26. Each optical data modulator 24, 26 optically modulates a digital data stream onto its respective polarization component of the optical wavelength carrier. The optical outputs of optical data modulators 24, 26 connect to optical inputs of polarization combiner PC via optical paths OP. Polarization combiner PC has an optical output that connects to the near end of optical fiber line 16. The modulated optical signals from modulators 24, 26 are injected into the near end of optical fiber line 16 and carried over it by the respective orthogonal polarization states of the optical wavelength carrier.

Each electrical driver 28, 30 receives digital control signals from DSP 32 and, in response, it outputs respective analog voltage-drive signals to operate optical data modulators 24, 26. More specifically, each electrical driver 28, 30 receives a respective series of digital control signals $$X_k^{out}, X_{k+1}^{out}, \dots, \text{or } Y_k^{out}, Y_{k+1}^{out}, \dots,$$

from DSP 32 and converts it to analog voltage-drive-signals, typically at radio frequency, for operating a corresponding optical data modulators. The indices k, k+1, etc., identify the timeslots for discrete modulation pulses.

The x-series and y-series digital control signals control the modulation of the x and y polarization components of the optical carrier, respectively. In some implementations, the drive control signals may also provide for some pre-compensation of nonlinear optical effects and possibly for some pre-compensation of dispersion in the optical fiber line 16.

As shown in the figure, DSP 32 receives, as input, a digital symbol stream $\{X_k\}=X_k$, $X_{k+1}$, etc. and a digital symbol stream $\{Y_k\}=Y_k$, $Y_{k+1}$, etc. DSP 32 processes these received digital symbol streams to generate the corresponding digital signals $$X_k^{out}, X_{k+1}^{out}, \dots, \text{and } Y_k^{out}, Y_{k+1}^{out}, \dots,$$

respectively. The digital symbol streams $X_k$, $X_{k+1}$, etc. and $Y_k$, $Y_{k+1}$, etc. are generated by a digital modulator such as a QAM modulator, which is situated upstream of DSP 32 and is not shown in the figure.

The digital modulator produces the digital symbol streams by mapping input data, in the form of a binary bitstream, to symbols selected from a desired modulation constellation.

Figure 3:
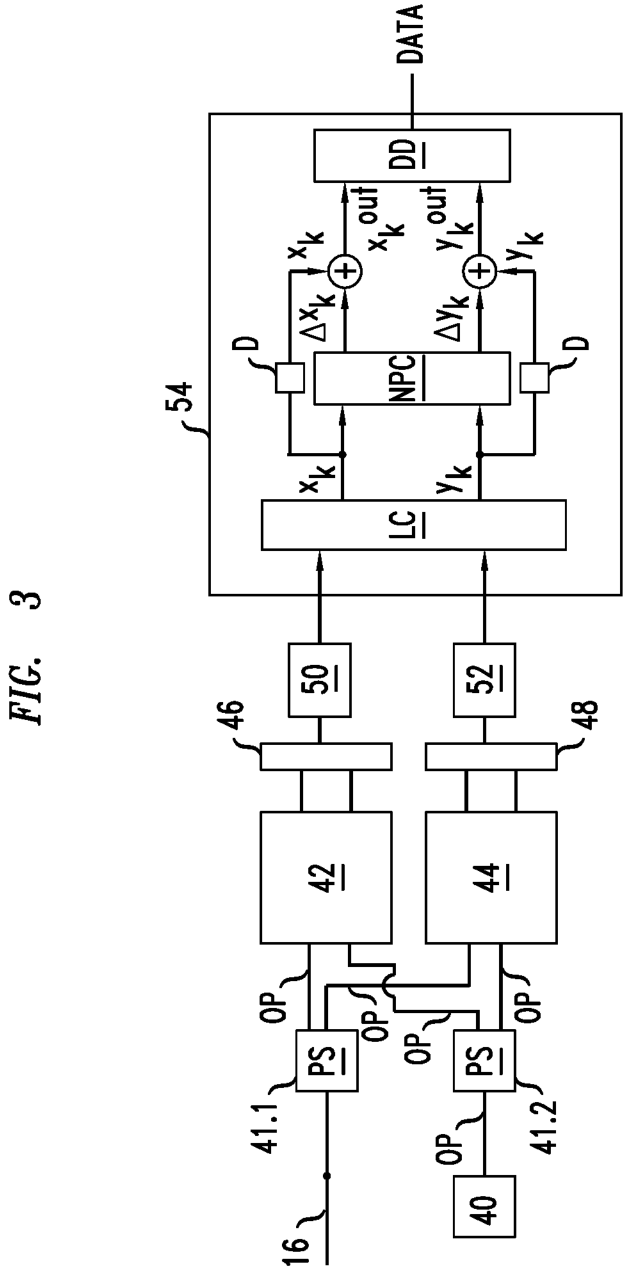
FIG. 3 is a block diagram illustrating a coherent optical data receiver that digitally implements some post-compensation of nonlinear optical effects in a DSP thereof.

FIG. 3 illustrates an example embodiment 14' of the optical data receiver 14 of FIG. 1, configured for use in a coherent optical fiber communication system. As will be explained below, optical data receiver 14' digitally post-compensates, at least in part, for nonlinear optical effects that arise in the all-optical fiber line 16.

Optical data receiver 14' may receive independent signals on each of a multiplicity of optical carriers having different wavelengths. In other words, optical data receiver 14' may receive in multiple wavelength channels. For simplicity of presentation, however, optical data receiver 14' is described here without explicit reference to more than a single wavelength channel.

As shown in the figure, optical data receiver 14' includes a local optical oscillator 40; first and second polarization splitters 41.1, 41.2, first and second optical mixers 42, 44; photodetector arrays 46, 48; two electrical hardware series 50, 52; and DSP 54.

Local optical oscillator 40 is exemplarily a narrow bandwidth, telecommunication laser with a wavelength near the wavelength of the optical data transmitter 12 of FIG. 1 as would be suitable, for example, for intradyne coherent optical detection.

In the illustrated example, the optical signal received from the end of the optical fiber line 16 is directed to optical polarization splitter 41.1, which resolves two orthogonal polarization components of the received light and transmits them over optical paths OP to respective optical inputs of first and second optical mixers 42, 44. The optical output from local oscillator 40 is directed over an optical path OP to optical polarization splitter 41.2, which resolves two orthogonal polarization components of the light from local oscillator 40 and transmits them over optical paths OP to respective optical inputs of first and second optical mixers 42, 44. Thus, each of the optical mixers 42, 44 receives a respective one of the orthogonal polarization components of an optical signal, i.e., the x-component or the y-component, from each of polarization splitters 41.1 and 41.2.

Each of optical mixers 42, 44 combines the light it receives from the optical input signal with the light it receives from the local optical oscillator to produce a respective one of two modulation components of the received optical input signal. By way of illustration, optical mixer 42 may, e.g., combine the x-components of the light it receives from the optical polarization splitters to provide, as output, an optical signal representing the in-phase (I) component of the received optical signal. Correspondingly, optical mixer 44 would combine the y-components of the light it receives from the optical polarization splitters to provide, as output, an optical signal representing the quadrature (Q) component of the received optical signal.

Each of optical mixers 42 and 44 has a pair of mutually phase-shifted optical outputs, as shown in FIG. 3. These phase shifts condition the output signals for coherent optical detection, according to principles well-known in the art.

Each pair of outputs from optical mixers 42 and 44 is directed to a respective photodetector array 46, 48. Each of photodetector arrays 46, 48 is configured to generate an analog electrical signal indicative of, respectively, the I component or the Q component of the received optical signal, in response to the input that it receives from its respective optical mixer. According to typical practice in the art, the signal in the x-polarization channel corresponds to the I component, and the signal in the y-polarization channel corresponds to the Q component of the received optical signal.

In illustrative examples, each of the optical mixers 42, 44 comprises a 90-degree optical hybrid, and each of the optical intensity photodetector arrays 46, 48 comprises a balanced pair of photodiodes connected for differential detection of optical intensity.

In the example illustrated in FIG. 3, the electrical output from each photodetector array 46, 48 is directed to a respective series 50, 52 of electronic hardware components. As known in the art, each series 50, 52 may include, e.g., an electronic amplifier, an electronic low-pass filter, and an analog-to-digital converter. Series 50 and series 52 process the photodetector output in the respective x-polarization and y-polarization channels according to known methods such as low-pass filtering. The processing in series 50 and series 52 includes analog-to-digital conversion (not shown explicitly in the figure), which results in a digital electrical signal output in each polarization channel.

The digital signal streams output from series 50 and series 52 are directed to digital signal processor (DSP) 54.

DSP 54 digitally processes the x-channel and y-channel digital signal streams received from series 50 and series 52, thereby to recover the data symbol streams transmitted by the optical data transmitter 12 of FIG. 1. In typical examples, as illustrated, e.g., in FIG. 3, DSP 54 includes a linear processing circuit (LC). The linear processing circuit may be used, for example, to at least partially compensate for signal degradation from such sources as chromatic dispersion, polarization dispersion, polarization rotation, and attenuation in optical fiber line 16.

Figure 10:
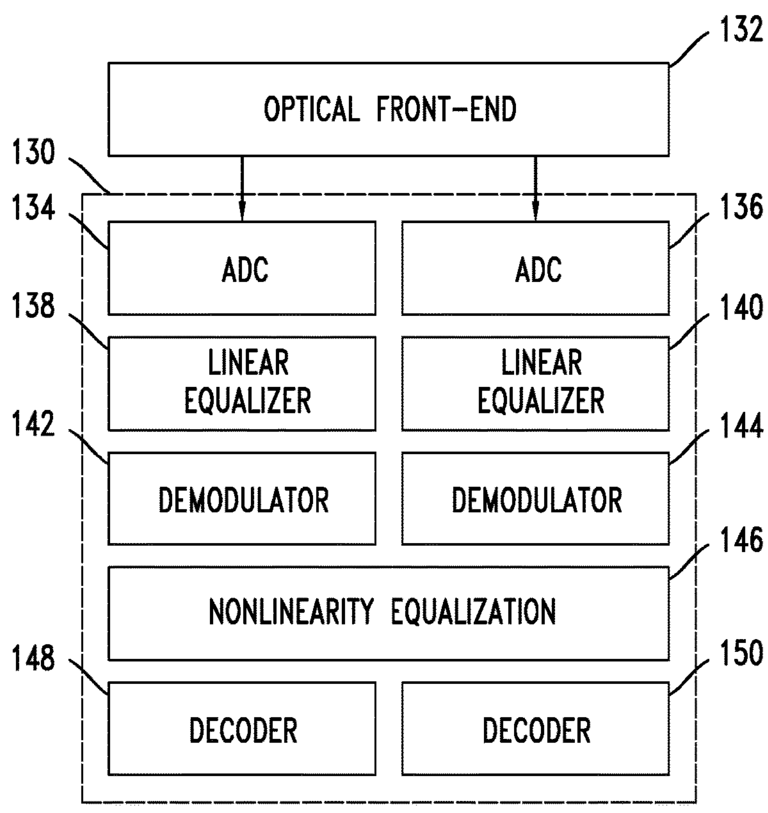
FIG. 10 is a block diagram in which an architecture for a coherent optical receiver is represented as an optical front end and a DSP chain.

DSP 54 also typically includes circuitry to correct frequency offsets between the local optical oscillator 40 and the optical input signal received from optical fiber line 16. Frequency-offset compensation is generally regarded as part of the linear processing. For that reason, the frequency-offset compensation has not been separately called out in FIG. 3, but should instead be understood as included within the operations performed by the linear processing circuit. (By contrast, linear processing is represented in FIG. 10, which is discussed below, by separate "linear equaliser" blocks and "demodulator" blocks. The demodulator blocks in FIG. 10 perform carrier-frequency recovery and carrier-phase recovery.)

The output of linear processing circuit LC consists, in the illustrated example, of digital signal stream $\{x_k\}=x_k, x_{k+1} \ldots$ in the x-channel and digital signal stream $\{y_k\}=y_k, y_{k+1} \ldots$ in the y-channel. The index "k" is the sequential label for a sampling timeslot.

Downstream of linear processing circuit LC, DSP 54 processes the digital signal streams $\{x_k\}$ and $\{y_k\}$ to produce digital signal streams $$\{x_k^{out}\} = x_k^{out}, x_{k+1}^{out}, \ldots , \text{ and } \{y_k^{out}\} = y_k^{out}, y_{k+1}^{out},$$

The processing that produces signal streams $$\{x_k^{out}\} \text{ and } \{y_k^{out}\}$$

is carried out to at least partially compensate for signal degradation due to nonlinear optical effects in the optical fiber line 16 of FIG. 1.

More specifically, DSP 54 includes a nonlinear processing circuit NPC for processing of the digital signal streams $\{x_k\}$ and $\{y_k\}$. For each of these digital signal streams $\{x_k\}$ and $\{y_k\}$, the nonlinear processing circuit NPC outputs respective streams $\{\Delta x_k\}=\Delta x_k, \Delta x_{k+1} \ldots$ and $\{\Delta y_k\}=\Delta y_k,$ $\Delta y_{k+1}$ . . . of correction factors. DSP 54 also includes elements, as indicated in FIG. 3, that subtract the correction factors $\Delta x_k$, $\Delta y_k$ from their corresponding digital signal elements $X_k$, $y_k$, to produce the at least partially compensated digital data output signals $$x_k^{out}, y_k^{out}.$$

As indicated in the figure, DSP 54 also includes delay elements D to correct for processing delay so that the signal streams $\{x_k\}$, $\{y_k\}$ are temporally aligned with the correction streams $\{\Delta x_k\}$, $\{\Delta y_k\}$ at the elements where the correction factors are subtracted.

As explained above, optical data transmitter 12 of FIG. 1 includes a digital modulator that produces digital symbol streams for transmission by mapping input data, in the form of a binary bitstream, to symbols selected from a desired modulation constellation. Turning back to FIG. 3, DSP 54 may include a processing stage that operates to recover the binary bitstream that was transmitted by optical data transmitter 12.

More specifically, DSP 54 may include, for example, a conventional digital decoder DD that operates to recover the transmitted data symbols as a binary bitstream. The signal streams $$\{x_k^{out}\} \text{ and } \{y_k^{out}\}$$

that are input to digital decoder DD jointly constitute a representation of the transmitted stream of data symbols from a symbol constellation. In operation, the digital decoder DD performs an inverse mapping of these constellation symbols back to a binary bitstream, which is designated "DATA" in FIG. 3. The digital decoder DD may also provide for conventional error correction. For example, it may perform forward error correction (FEC) corresponding to FEC coding implemented in optical data transmitter 12 of FIG. 1.

Figure 4:
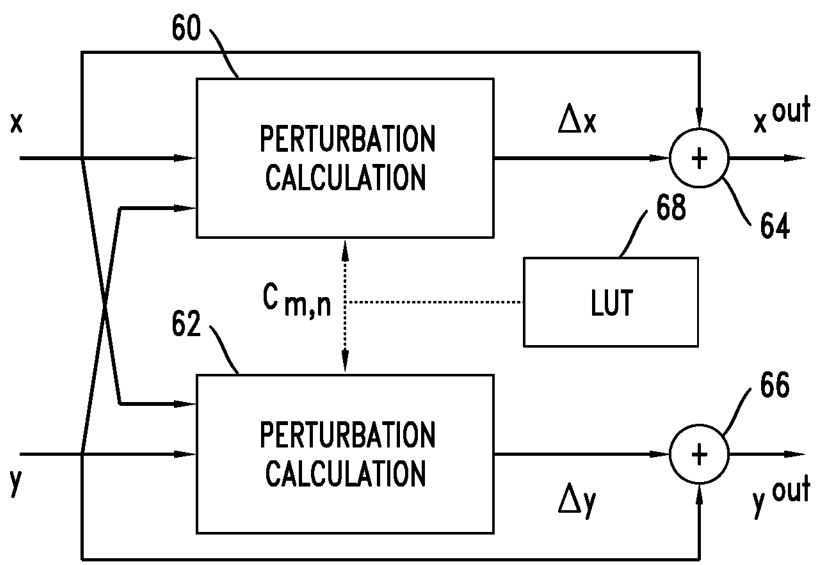
FIG. 4 is a block diagram of a PNC equalizer circuit that, by operating on input signal streams, can perform nonlinear processing to produce streams of perturbation terms, correct symbol components of the input signal streams by combining them with respective perturbation terms, and output corrected signal streams.

FIG. 4 is a block diagram of a PNC equalizer circuit that can perform nonlinear processing on input signal streams $\{x_k\}$ and $\{y_k\}$ to produce streams $\{\Delta x_k\}$ and $\{\Delta y_k\}$ of perturbation terms, correct each symbol component $x_k$ or $y_k$ by combining it with its respective perturbation term $\Delta x_k$ or $\Delta y_k$, and output the corrected signal streams $$\{x_k^{out}\} \text{ and } \{y_k^{out}\}.$$

Accordingly, FIG. 4 shows block 60 for the x-channel perturbation calculation that produces stream $\{\Delta x_k\}$, block 62 for the y-channel perturbation calculation that produces stream $\{\Delta x_k\}$, additive element 64 that subtracts each perturbation term $\Delta x_k$ from its corresponding symbol component $x_k$ to produce the corresponding corrected symbol component $$x_k^{out}$$

as output, and additive element 66 that subtracts each perturbation term $\Delta y_k$ from its corresponding symbol component $y_k$ to produce the corresponding corrected symbol component $$y_k^{out}$$

as output.

Although it has been omitted from the drawing to simplify the presentation, those skilled in the art will understand that the equalizer circuit of FIG. 4 also includes delay elements for the $\{x_k\}$ and $\{y_k\}$ streams so that the respective symbol components $x_k$ and $y_k$ are temporally aligned at the respective additive elements with their corresponding perturbation terms.

FIG. 4 also shows look-up table (LUT) 68, which provides perturbation coefficients $C_{m,n}$ as inputs to the x-channel and y-channel perturbation calculations. The perturbation coefficients and their role in the perturbation calculation are defined in greater detail below. The perturbation coefficients depend on the link configuration. In examples, they can be calculated offline or, alternatively, estimated by means of a Least Mean Square (LMS) algorithm as reported, for example, in W. Peng et al, "Training-based Determination of Perturbation Coefficients for Fiber Nonlinearity Mitigation," 2015 *Optical Fiber Communications Conference and Exhibition* (*OFC*) (2015) 1-3.

Computations of the perturbation coefficients may be based, for example, on transmitter information, known a priori, of the channel chromatic dispersion, the fiber nonlinear coefficient, the inhomogeneous span length, and the random fiber launch power.

The values that are obtained for the perturbation coefficients may be stored quasistatically in LUT 68.

By way of example, a useful calculation of the perturbation coefficients can be based on a channel model reported in R. Dar et al., "Inter-Channel Nonlinear Interference Noise in WDM Systems: Modeling and Mitigation," *J. Lightwave Technol.* 33 (2015)1044-1053. As reported there, a model of fiber nonlinearity assumes the temporal pulse matching condition as reported, e.g., in A. Ghazisaeidi and R. Essiambre, "Calculation of coefficients of perturbative nonlinear pre-compensation for Nyquist pulses," *The European Conference on Optical Communication* (*ECOC*), Cannes (2014) 1-3. Under those models, the perturbation coefficients can be calculated by:

$$C_{m,n} = -S_{m,n,m+n} \tag{1}$$

$$S_{m,n,1} = \int_0^L dz\ f(z) \int_{-\infty}^{+\infty} dt\ h^*(z,t)\ h(z,t-mT) h(z,t-nT) h^*(z,t-1T) \tag{2}$$

In the above expressions, the $S_{m,n,l}$ are complex coefficients, m, n, and l are discrete time indices, t is the (continuous) time variable, L is the total link length, the function f(z) accounts for the loss/gain profile of the fiber link, and h(z, t) is the pulse-shaping waveform propagated in the fiber up to the distance z.

A perturbation calculation that could be performed, for example, by the PNC circuit of FIG. 4 is given by:

$$\Delta x_k = \sum_{m=-M}^{M} \sum_{n=-N}^{N} C_{m,n} \cdot (x_{k-m} x_{k-n} x_{k-m-n}^* + x_{k-m} y_{k-n} y_{k-m-n}^*) \tag{3}$$

-continued $$\Delta y_k = \sum_{m=-M}^{M}\sum_{n=-N}^{N} C_{m,n}\cdot(y_{k-m}y_{k-n}y^*_{k-m-n} + y_{k-m}x_{k-n}x^*_{k-m-n}) \quad (4)$$

The limits M and N of the summations in the above equations depend primarily on the signal-accumulated dispersion in the fiber link. As such, they are system parameters. For a given system scenario, there will generally be a most favorable pair of M and N values that optimizes the equalizer performance. These values have a broad range in practical applications, up to values on the order of 1000 or more, depending on the system architecture. Reducing the M and N values may simplify the circuit complexity, but such simplification could exact a cost in degraded equalizer performance.

Although the optimal values depend on the signal-accumulated dispersion, this relationship has not been suitably modeled as a closed-form expression, due to the complexity of modeling nonlinear behavior. Hence, the optimal values will generally be obtained by numerical simulation.

A computational approach that can reduce the complexity of the perturbation calculation is reported in the publication EP 3,157,180 A1, which was cited above. As explained there, Equations (3) and (4) can be rewritten such that the k'th perturbation term is expressed as a weighted sum of 2M+1 symbols $x_{k-m}$, or $y_{k-m}$, in which each of the weights is expressed as a convolution over the index n between perturbation coefficients $C_{m,n}$ and product terms $$d_{k-n}^{(m)}.$$

The product terms are defined by:

$$d_{k-n}^{(m)} = (x_{k-n}x^*_{k-m-n} + y_{k-n}y^*_{k-m-n}). \quad (5)$$

That is, by substituting the quantities $$d_k^{(m)},$$

the expressions for $$x_k^{out} \text{ and } y_k^{out}$$

can be rewritten as:

$$x_k^{out} = x_k + \sum\nolimits_{m=-M}^{M} x_{k-m}\left[\sum\nolimits_{n=-N}^{N} C_{m,n}d_{k-n}^{(m)}\right] \quad (6)$$

$$y_k^{out} = y_k + \sum\nolimits_{m=-M}^{M} y_{k-m}\left[\sum\nolimits_{n=-N}^{N} C_{m,n}d_{k-n}^{(m)}\right], \quad (7)$$

where each of the bracketed expressions represents 2M+1 convolutions.

Convolutions, as such, are evaluated in the discrete time domain. However, each of the convolutions in Equations (6) and (7) can be formulated, equivalently, as a linear filter to be evaluated in the frequency domain. The filter taps in the time domain are the coefficients $C_{m,n}$.

Conversion between the time and frequency domains is effectuated by using, e.g., the fast Fourier transform (FFT) and its inverse (IFFT). Computing the filtering in the frequency domain by Fast Fourier Transform (FFT), and then transforming back with Inverse Fast Fourier Transform (IFFT) is beneficial because it reduces the computational complexity to Order (M log N).

Accordingly, the running double-sum terms in Equations (6) and (7) can each be computed in the following three steps:

(i) Compute the products $$d_k^{(m)};$$

(ii) Compute the output values of the bank of 2M+1 linear filters in parallel;

(iii) Compute the weighted sum of the filter outputs.

Figure 5:
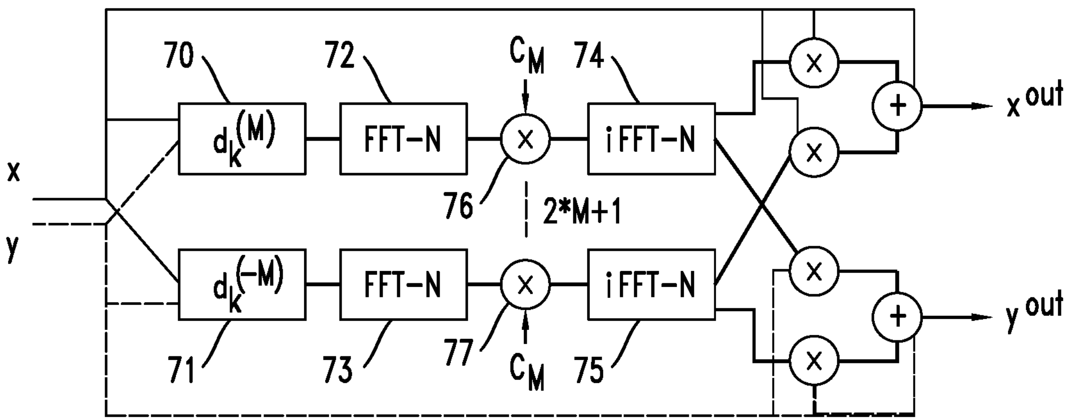
FIG. 5 is a simplified block diagram of PNC Implementation with FFT processing according to principles described here.

FIG. 5 is a simplified block diagram of PNC implementation with FFT processing. In the figure, blocks 70 and 71 compute the products $$d_k^{(m)}.$$

Blocks 72 and 73 transform the problem into the frequency domain, where the convolution in the above bracketed expressions becomes a multiplicative product. Blocks 74 and 75 compute the IFFT. The multiplication with the perturbation coefficients $C_{m,n}$ is performed at multipliers 76 and 77 in the frequency domain.

In FIG. 5, the symbols $C_M$ and $C_{-M}$, together with the legend 2*M+1 indicate that there is a bank of 2M+1 branches, only two of which are expressly drawn in the figure. For each index m=−M, . . . , 0, . . . , M, the full set of perturbation coefficients, or, equivalently, the full set of taps of the corresponding linear filter, is $C_m=\{C_{m,-N}, \ldots, C_{m,N}\}$. Similarly, the symbols $$d_k^{(M)} \text{ and } d_k^{(-M)}$$

represent two of the 2M+1 sets of products $$d_k^{(M)} = \{d_{k-N}^{(m)}, \ldots, d_{k+N}^{(m)}\}.$$

Figure 6:
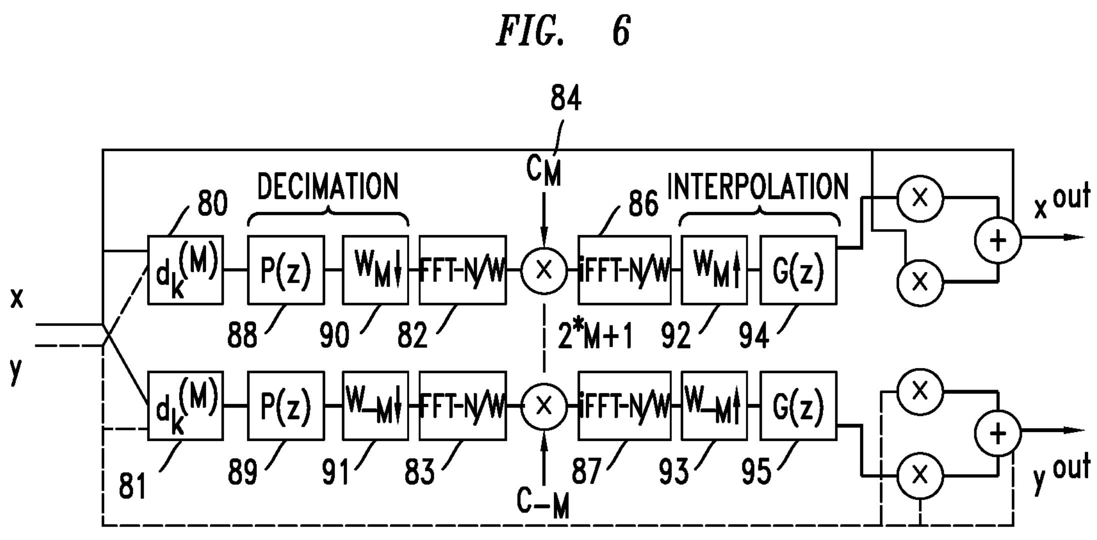
FIG. 6 is a simplified block diagram of an architecture for PNC equalization with reduced computational complexity.

U.S. Pat. No. 10,756,822, which was cited above, reports an approach that can further reduce the computational complexity. FIG. 6 is a simplified block diagram of an architecture that can implement such an approach. As shown in the figure, the architecture includes a $$d_k^{(m)}$$

computation 80, 81, a FFT stage 82, 83, a multiplier stage 84, and an IFFT stage 86, 87, as in FIG. 5. However, the $$d_k^{(m)}$$

terms are filtered 88, 89 with a low-pass anti-aliasing digital filter P(z), and they are decimated 90, 91 accordingly. These operations are equivalent to down-sampling. They reduce the size of the $$d_k^{(m)}$$

array to be computed, per symbol, to (2M+1)·(2N+1)/W, where W is the decimation factor, also referred to as the decimation rate. A decimation rate of 10 is illustrative, but other values are not excluded.

The bandwidth of the low-pass anti-aliasing filter P(z) is determined by the decimation rate. Different impulse responses can be adopted for the low-pass anti-aliasing filter. After the low-pass filtering, the $$d_k^{(m)}$$

terms are decimated in accordance with the decimation rate by selecting only one in every W samples.

The down-sampled set of $$d_k^{(m)}$$

terms are then filtered by the (2M+1) parallel filters. The filtering step can be performed by FIR filters, or, as illustrated in FIG. 6, it can be performed in the frequency domain with FFT. Because of the downsampling, the filter tap size is (2N+1)/W. The filter output terms are then up-sampled by interpolation 92, 93 so that at the output stage where they are multiplied by the input $x_k$ and $y_k$ samples, they will have the same sampling rate as the input $x_k$ and $y_k$ samples. As shown in FIG. 6, the interpolation process includes blocks 94 and 95, which represent a low-pass anti-imaging filter G(z), as is known in the art.

Perturbation terms may be computed by soft-decision PNC according to the following equations (8) and (9):

$$\Delta\, x_k^{(soft)} = \sum_{m=-M}^{M} \sum_{n=-N}^{N} C_{m,n} \cdot (x_{k-m} x_{k-n} x_{k-m-n}^{*} + x_{k-m} y_{k-n} y_{k-m-n}^{*}) \tag{8}$$

$$\Delta\, y_k^{(soft)} = \sum\nolimits_{m=-M}^{M} \sum\nolimits_{n=-N}^{N} C_{m,n} \cdot (y_{k-m} y_{k-n} y_{k-m-n}^{*} + y_{k-m} x_{k-n} x_{k-m-n}^{*}) \tag{9}$$

$$\Delta\, y_k^{(soft)} = \sum_{m=-M}^{M} \sum_{n=-N}^{N} C_{m,n} \cdot (y_{k-m} y_{k-n} y_{k-m-n}^{*} + y_{k-m} x_{k-n} x_{k-m-n}^{*}) \tag{9}$$

Equations (8) and (9) are identical to Equations (3) and (4), except that the computed perturbation terms are marked with the superscript "soft" to emphasize that these terms have been computed from received input symbols that are soft symbols.

Figure 7:
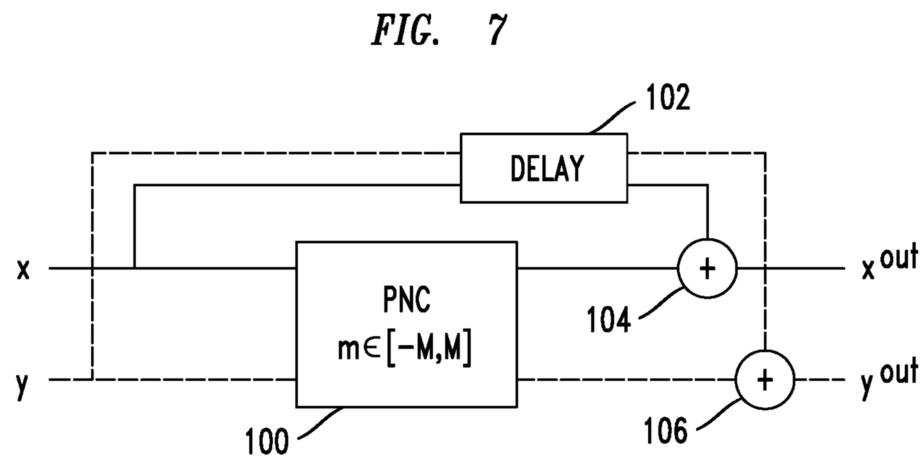
FIG. 7 is a simplified block diagram of a scheme for soft-decision PNC according to principles that are described here.

FIG. 7 is a simplified block diagram of the soft-decision PNC scheme. The corrected symbols are computed at the PNC block 100. To simplify the figure, it has been made implicit that the summations over n in Equations (8) and (9) are subsumed into 2M+1 computational branches, each having an index m, and the legend "m∈[−M, M]" indicates that m takes the values −M, . . . , 0, . . . , M. As shown in the figure, the soft symbols $x_k$ and $y_k$ take two paths.

In the upper path, the soft symbols are delayed 102. In the lower path, the soft symbols pass through the PNC block 100, which outputs the perturbation terms. The perturbation terms are added 104, 106 to the delayed soft symbols $x_k$ and $y_k$.

As pointed out above, the evaluation of the perturbation terms according to the method of FIG. 7 is computationally expensive, not least because the multiplicative products of the form $$x_{k-m} x_{k-n} x_{k-m-n}^{*},\ x_{k-m} y_{k-n} y_{k-m-n}^{*}, \tag{8}$$

$y_{k-m} y_{k-n} y_{k-m-n}^{*}$, and $y_{k-m} x_{k-n} x_{k-m-n}^{*}$ in Equations and (9) involve plural multiplications among complex-valued soft symbols.

Under our new hard-decision PNC scheme, the perturbation terms are evaluated according to:

$$\Delta x_k^{(hard)} = \sum\nolimits_{m=-M}^{M} \sum\nolimits_{n=-N}^{N} C_{m,n} \cdot (\hat{x}_{k-m} \hat{x}_{k-n} \hat{x}_{k-m-n}^{*} + \hat{x}_{k-m} \hat{y}_{k-n} \hat{y}_{k-m-n}^{*}) \tag{10}$$

$$\Delta y_k^{(hard)} = \sum\nolimits_{m=-M}^{M} \sum\nolimits_{n=-N}^{N} C_{m,n} \cdot (\hat{y}_{k-m} \hat{y}_{k-n} \hat{y}_{k-m-n}^{*} + \hat{y}_{k-m} \hat{x}_{k-n} \hat{x}_{k-m-n}^{*}). \tag{11}$$

Equations (10) and (11) are similar in form to Equations (8) and (9). However, the perturbation terms are marked with the superscript "hard" to emphasize that they are computed from hard, rather than soft, symbols. Likewise, the $x_k$ and $y_k$ terms in Equations (10) and (11) are marked with a circumflex to emphasize that they are hard, rather than soft, symbols.

Figure 8:
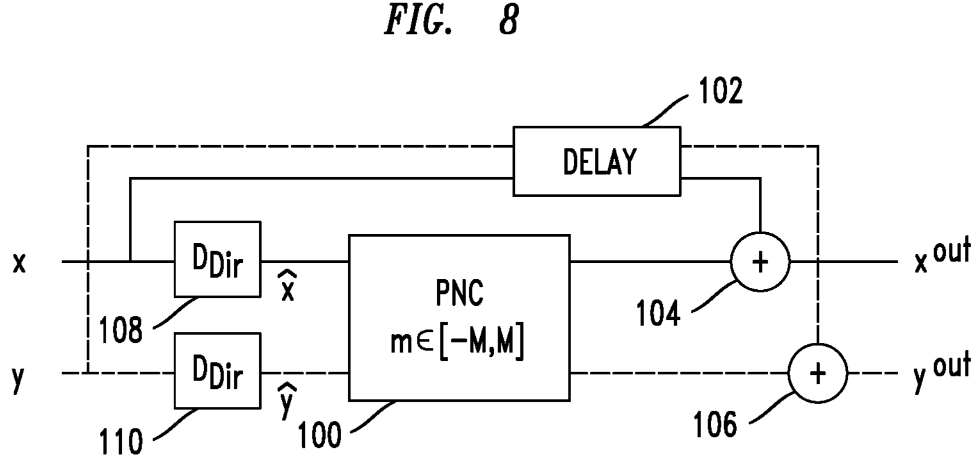
FIG. 8 is a simplified block diagram of a new scheme for hard-decision PNC according to principles that are described here.

FIG. 8 is a simplified block diagram of our new hard-decision PNC scheme. Elements that FIG. 8 has in common with FIG. 7 are called out with like reference numerals. The architecture of FIG. 8 is similar to the architecture of FIG. 7, except that the inputs to the PNC block 100 are now hard symbols. More specifically, the incoming soft symbols $x_k$ and $y_k$ take two paths. In the upper path, the soft symbols are delayed 102. In the lower path, the soft symbols pass through respective decision-directed ($D_{Dir}$) blocks 108, 110, where the hard decision is implemented. The outputs from the $D_{Dir}$ blocks are the hard symbols $x_k$ and $y_k$, which are fed as input to the PNC block 100. Thus, $D_{Dir}$ is a symbol-to-symbol mapping of the received, soft symbol to a constellation point in a hard-decision operation according, e.g., to a maximum a posteriori (MAP) detection.

Once the perturbation has been computed using the hard symbols, it is added 104, 106 to the delayed soft symbols $x_k$ and $y_k$.

The hard-decision PNC scheme of FIG. 8 has a single PNC stage. Although such a single-stage scheme offers a beneficial reduction in computational complexity, it also has the drawback that under at least some scenarios, it is subject to performance degradation because the hard decisions on the received symbols can introduce decision error.

Figure 9:
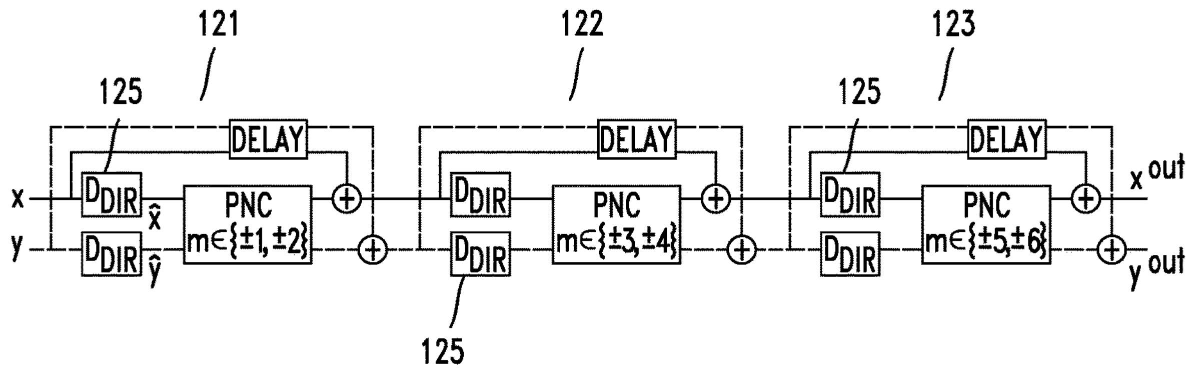
FIG. 9 is a simplified block diagram of a scheme for hard-decision PNC in a multistage implementation according to principles described here.

However, we have developed a multistage scheme that may make the decisions more reliable. FIG. 9 is a simplified block diagram of our multistage hard-decision PNC scheme. As shown in the figure, the PNC computation is now divided into a plurality of serial stages 121, 122, 123, each of which includes a hard-decision operation 125 on the soft symbols in each of the two polarization channels.

In each stage, a different nonlinear contribution is evaluated and applied to the incoming signal. What we mean by "nonlinear contribution" is best understood by referring back to FIG. 5, which shows an example in which the perturbation terms are computed in 2M+1 computational branches, each indexed by a respective value of the index m. Each of these 2M+1 computational branches provides a respective "nonlinear contribution".

Turning back to FIG. 9, it should be noted that each PNC stage in FIG. 9 computes the perturbation terms by implementing only a selected few, but not all, of the 2M+1 computations branches.

In each stage of the multistage scheme, the index m that identifies the selected branches can take on only a subset of all the possible values from −M to M. Each stage implements a subset that is independent of the subsets implemented by the other stages, i.e., no two of these subsets have any elements in common. By way of illustration, FIG. 9 provides a nonlimiting example in which for the first stage, m takes the values −2, −1, 1 2, for the second stage, m takes the values −4, −3, 3, 4, and for the third stage, m takes the values −6, −5, 5, 6. A serial scheme of this kind is feasible because each nonlinear contribution is independent of the others.

Although FIG. 9 provides an example in which there are three stages, this number should not be understood as limiting. In particular embodiments, there may be as few as two stages, or even a single stage, whereas in other embodiments the number of stages may be greater than three.

After each PNC stage, the soft symbols are updated by summing them with the new values of the perturbation coefficients. After each update, the updated symbols in each polarization channel go forward on an upper branch to the next update, and on a lower branch to the hard decision that precedes the next PNC stage. In this manner, the effective signal-to-noise ratio (SNR) of the signal may be improved stage-by-stage. As a consequence, the hard decisions that precede the respective stages may become progressively more reliable, which could reduce the overall decision error relative to Hard-Decision PNC with a single stage.

An example embodiment of an optical data receiver was discussed above, with reference to FIG. 3. Turning back to FIG. 3, it will be seen that the illustrated optical data receiver 14' includes a local optical oscillator 40; first and second polarization splitters 41.1, 41.2, first and second optical mixers 42, 44; photodetector arrays 46, 48; two electrical hardware series 50, 52; and DSP 54. One of the two photodetector arrays produces electrical output in the x-polarization channel, and the other photodetector array produces electrical output in the y-polarization channel.

It will also be seen that the electrical output from each photodetector array 46, 48 is directed to a respective series 50, 52 of electronic hardware components, in which each series includes, e.g., an electronic amplifier, an electronic low-pass filter, and an analog-to-digital converter (ADC). There is ADC output in each of the two polarization channels.

As illustrated in FIG. 3, the ADC outputs in the respective polarization channels (shown in the figure as the respective outputs of series 50 and series 52) are directed to digital signal processor (DSP) 54.

With further reference to FIG. 3, DSP 54 is seen to include a linear processing circuit (LC), a nonlinear processing circuit NPC that computes the perturbation terms, elements that combine the perturbation terms with their corresponding symbols from the received signal, and a processing stage such as the digital decoder DD that is shown in the figure.

The various processing stages illustrated in FIG. 3 that can be performed by a digital signal processor (DSP) may, in an alternative graphical presentation, be shown as elements of a DSP chain. FIG. 10 is a block diagram in which the architecture of FIG. 3 is represented, in part, as a DSP chain 130.

In FIG. 10, optical front end 132 includes the local optical oscillator, polarization splitters, optical mixers, and photodetector arrays of FIG. 3. Optical front end 132 also includes part of each electrical hardware series of FIG. 3. In FIG. 10, however, the ADC functionality has been broken out from the optical front end, and instead, it has been shown as a front part of the DSP chain 132. Accordingly, the ADC functionality is represented in FIG. 10 by ADC 134 for one of the two polarization channels and ADC 136 for the other of the two polarization channels.

With further reference to FIG. 10, DSP chain 130 is seen to include linear equalizer blocks 138 and 140 for the respective polarization channels. These blocks correspond to the linear processing circuit (LC) of FIG. 3. Demodulator blocks 142 and 144 follow the linear equalizer blocks. These demodulators, which in FIG. 3 were implicit in the linear circuit LC, perform carrier frequency recovery and carrier phase recovery for computing the soft symbols $x_k$, $y_k$ from the ADC output after linear equalization.

Nonlinearity Equalization block 146 of FIG. 10 corresponds to the nonlinear processing circuit NPC of FIG. 3, and Decoder blocks 148 and 150 of FIG. 10 correspond to the digital decoder DD shown in FIG. 3. By way of example, the decoder blocks 148 and 150 could implement FEC decoding.

With further reference to FIG. 10, the equalizer for Hard-Decision NPC is preferably placed, as shown, after the linear equalization and signal demodulation. This provides a way to ensure that computation can be performed at a rate of one sample per symbol. Once computed, each perturbation term output by the nonlinearity equalizer can be directly subtracted from the corresponding symbol before FEC decoding. This sequence is referred to as "hard-decision compensation".

Alternatively, the perturbation terms can be included in the computation of the symbol Log-Likelihood Ratios (LLRs) required for soft-decision FEC decoding. This alternative sequence is referred to as "soft-decision compensation.

Figure 11:
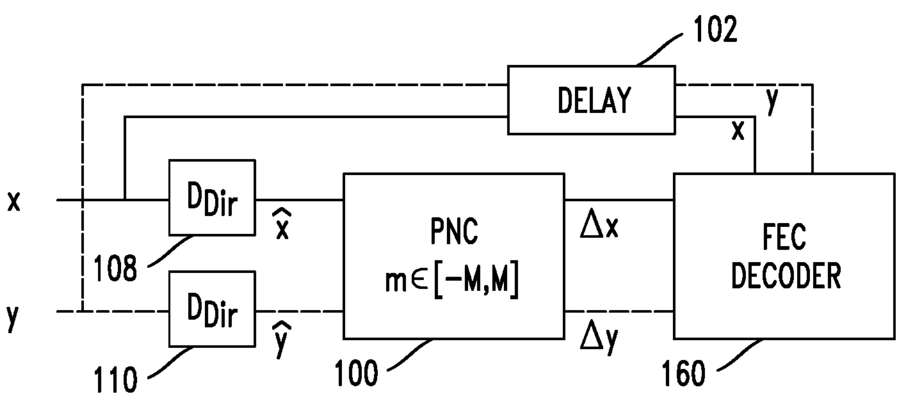
FIG. 11 is a simplified block diagram of an example scheme for soft-decision compensation according to principles described herein.

FIG. 11 is a simplified block diagram of an example scheme for soft-decision compensation. Drawing elements common to FIG. 8 and FIG. 11 are designated with like reference numerals. As shown in FIG. 11, the soft symbols $x_k$ and $y_k$, after the timing delay 102, are passed forward to soft FEC decoder 160. The outputs from PNC stage 100 are the perturbation terms $\Delta x_k$ and $\Delta y_k$, which are also passed forward to the soft FEC decoder.

As illustrated in FIG. 11, there is only a single PNC stage before the perturbation terms are passed forward to the soft FEC decoder for soft-decision compensation. If PNC is performed in multiple stages, the perturbation terms calculated in the last stage can be passed forward to the soft FEC decoder.

In either hard-decision compensation or soft-decision compensation, performing nonlinear compensation at the receiver side has the potential benefit that it can be implemented with an adaptive equalizer that estimates the $C_{m,n}$ coefficients by means of an LMS algorithm.

Figure 12:
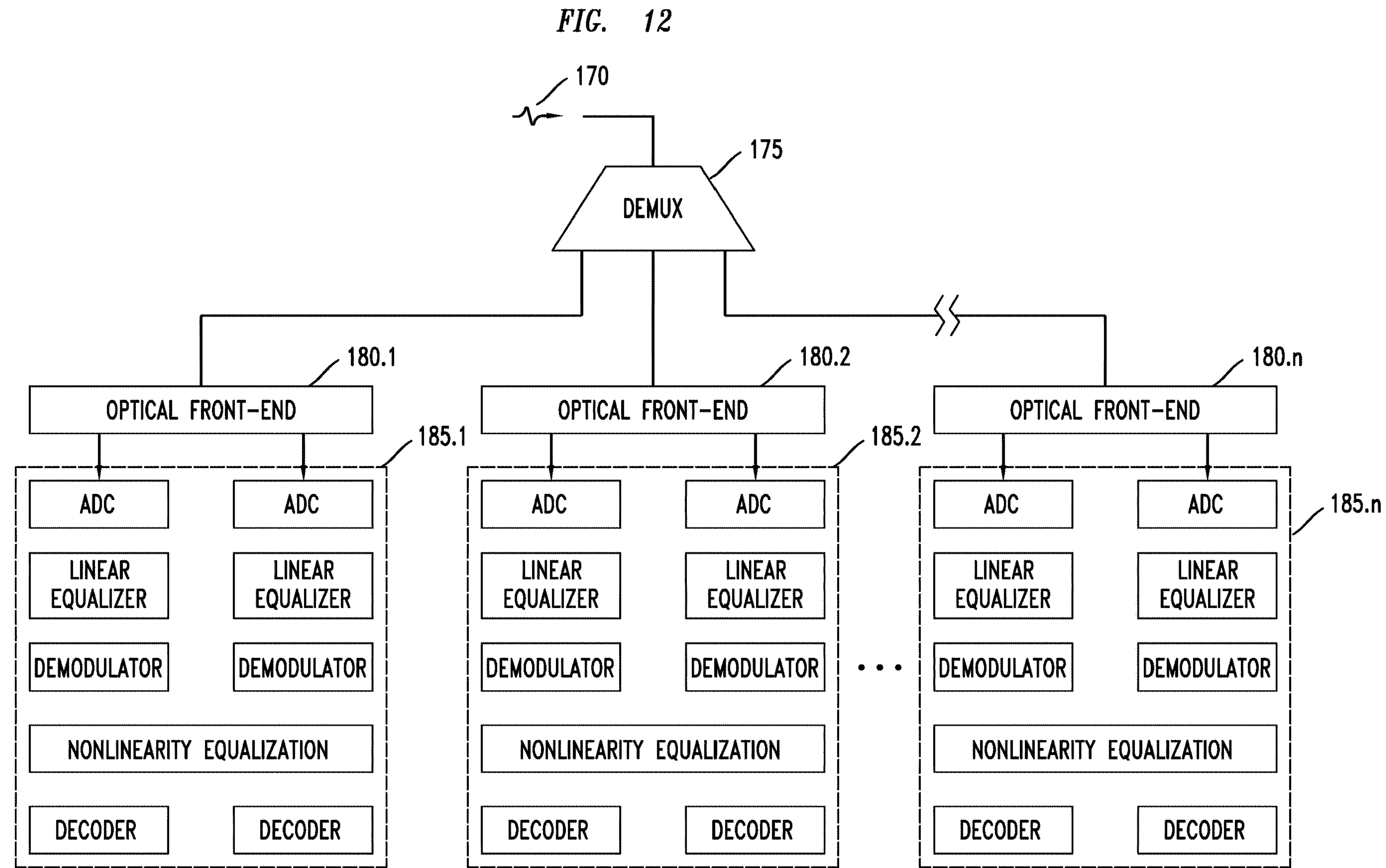
FIG. 12 is a simplified block diagram of an optical receiver architecture, in which processing of multiple wavelength channels is illustrated.

As noted above, an optical data receiver may receive independent signals on each of a multiplicity of optical carriers having different wavelengths. In other words, an optical data receiver may receive in multiple wavelength channels. For simplicity of presentation, however, the descriptions of an optical data receiver and the accompanying drawings do not make explicit reference to more than a single wavelength channel. FIG. 12 is a simplified block diagram of an optical receiver architecture, in which processing of multiple wavelength channels is illustrated. As shown in the drawing, the optical input signal 170 is wavelength demultiplexed at demultiplexer 175 into individual wavelength channels. The signal in each wavelength channel is directed to a respective optical front end 180.1, 180.2, . . . , 180.*n* and a respective DSP chain 185.1, 185.2, . . . , 185.*n*. Although omitted from the figure for simplicity of presentation, signals in multiple wavelength channels could be routed to each DSP chain to facilitate correction of interchannel interactions.

It is noteworthy that the techniques of Hard-Decision NPC described here can be applied to any standard modulation format for optical fiber transmission systems without introducing additive computational complexity.

Figure 13:
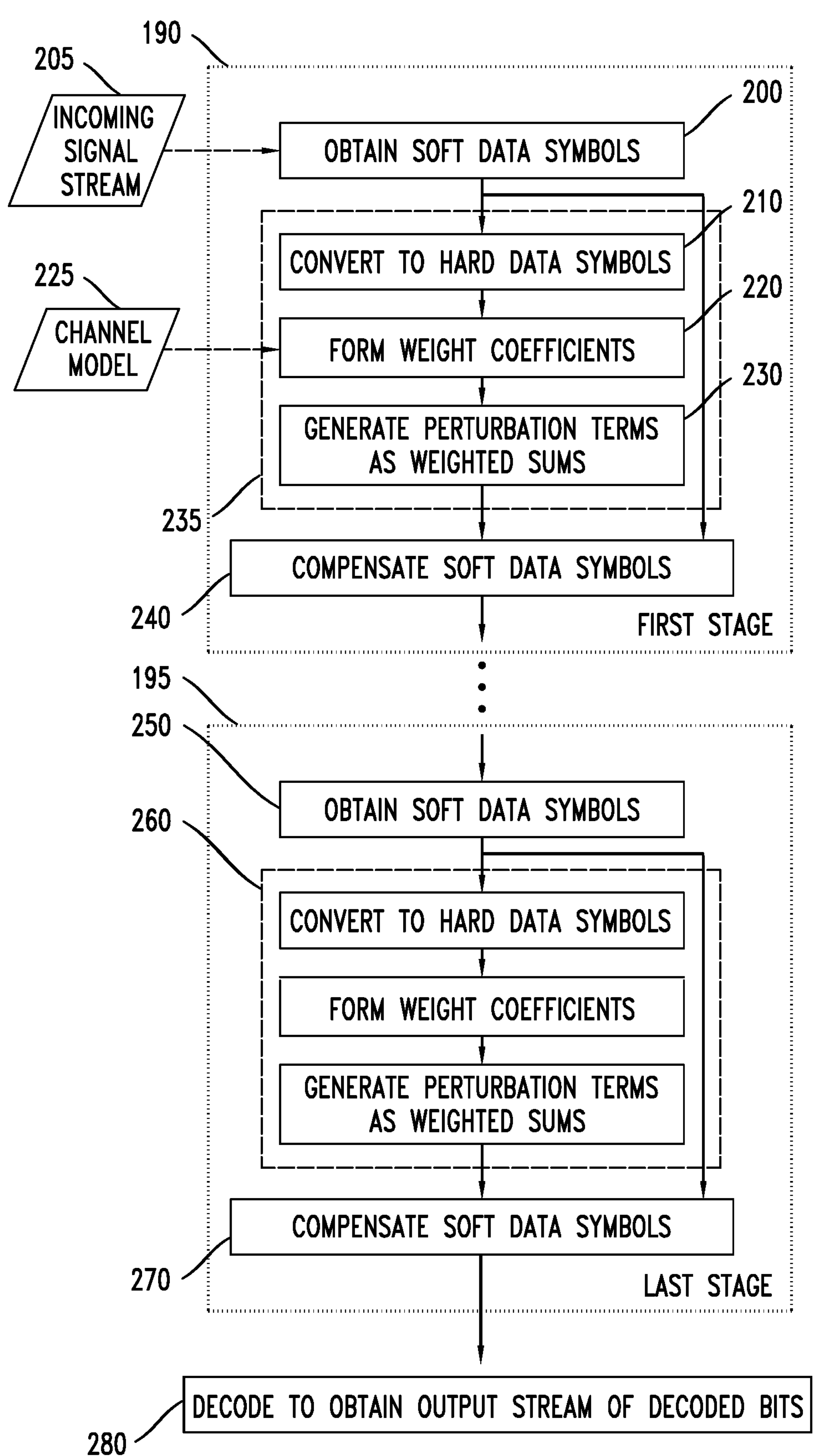
FIG. 13 summarizes, in a flowchart, a method according to some of the principles described here.

FIG. 13 summarizes, in a flowchart, a method according to some of the principles described here. The method is performed in one or more stages. In the figure, a first stage 190 and a last stage 195 are shown. Turning first to first stage 190, soft data symbols are obtained at block 200 from incoming signal stream 205. At block 210, the soft data symbols are converted to hard symbols. At block 220, weight coefficients are formed, using data from channel model 225. At block 230, the weight coefficients are used to generate perturbation terms as weighted sums. Blocks 210, 220, and 230 jointly constitute an operation 235 of providing the perturbation terms. At block 240, the perturbation terms are used to compensate the soft data symbols, thereby to provide compensated soft data symbols, which may be output to a decoder in a single-stage approach or, as shown in FIG. 13, passed forward to a next stage in a multistage approach.

In the last stage 195 of a multistage approach, the most recently compensated soft data symbols are obtained, at block 250, from the previous stage, and perturbation terms are provided in a block 260 similar to block 235 discussed above. At block 270, a stream of compensated soft data symbols is generated and passed forward to decoder block 280 for decoding to an output stream of decoded bits.

Figure 14:
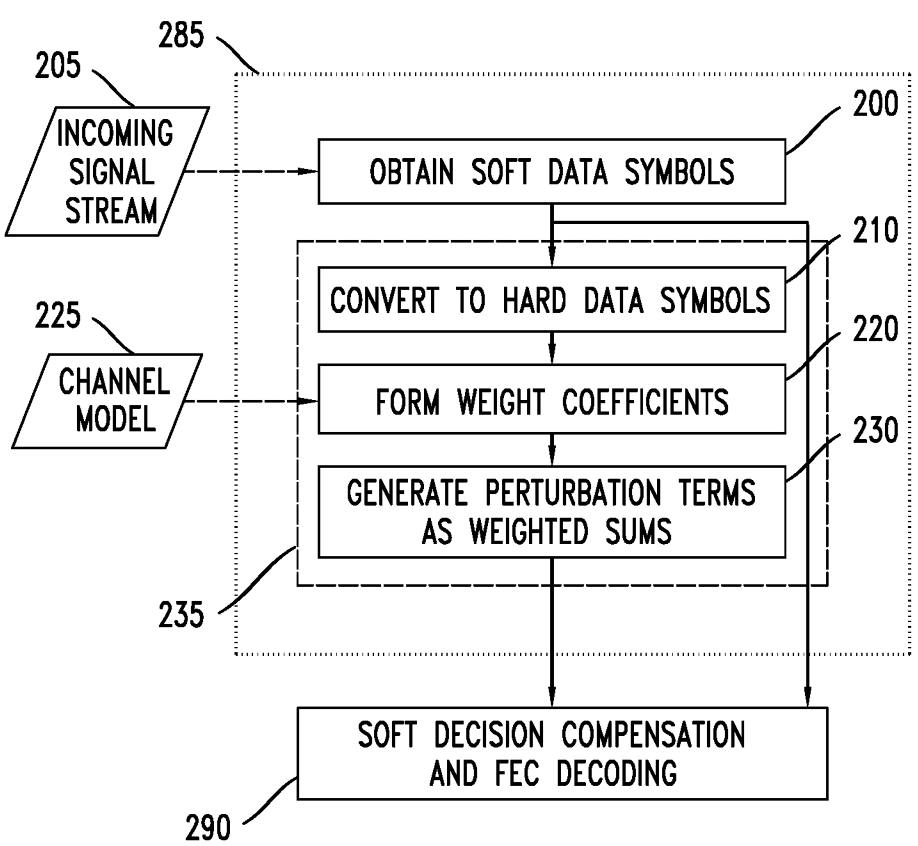
FIG. 14 summarizes, in a flowchart, an alternative method according to some of the principles described here.

FIG. 14 summarizes, in a flowchart, an alternative method according to some of the principles described here. As illustrated, the method is performed with a single stage 285, but the possibility of multi-stage implementations is not excluded.

Several of the blocks illustrated in FIG. 14 represent operations that are analogous to operations represented in corresponding blocks of FIG. 13 and, for that reason, are designated using like reference numeral.

Soft data symbols are obtained at block 200 from incoming signal stream 205. At block 210, the soft data symbols are converted to hard symbols. At block 220, weight coefficients are formed, using data from channel model 225. At block 230, the weight coefficients are used to generate perturbation terms as weighted sums. Blocks 210, 220, and 230 jointly constitute an operation 235 of providing the perturbation terms.

In a departure from the method of FIG. 13, the perturbation terms and the soft data symbols are passed forward to decoder block 290 for soft decision compensation and FEC decoding.

We claim:

1. A method, comprising, in each of one or more stages in a digital signal processor for a coherent optical receiver:

obtaining an input stream of soft data symbols;

generating a stream of perturbation terms that are representative of optical nonlinearity of an optical transmission channel; and using the perturbation terms to compensate respective ones of the soft data symbols in the input stream of soft data symbols for the optical nonlinearity, wherein:

the generating of the stream of perturbation terms comprises converting the input stream of soft data symbols to an input stream of hard data symbols and operating on the input stream of hard data symbols to produce the perturbation terms;

the operating on the input stream of hard data symbols comprises forming weight coefficients and forming, for each of the perturbation terms, a weighted sum of the hard data symbols using the weight coefficients; and the digital signal processor is configured to produce the input stream of soft data symbols of a first of the one or more stages from a stream of measurements of an optical signal received by the coherent optical receiver, wherein the using of the perturbation terms to compensate respective ones of the soft data symbols comprises subtracting the perturbation terms from respective ones of the said soft data symbols to generate the compensated ones of the soft data symbols, and wherein the method is performed in a series of the stages, wherein each stage evaluates a different nonlinear contribution and applies the evaluated different nonlinear contribution to the input stream of soft data symbols, and wherein in each stage after the first of the series, the obtaining comprises obtaining the compensated soft data symbols generated by the preceding one of the stages of the series.

2. The method of claim 1, wherein:

each said weight coefficient is formed, at least in part, by performing a convolution between a set of channel coefficients and a set of multiplicative products of hard data symbols; and the channel coefficients are complex numbers that characterize nonlinear effects in the optical transmission channel.

3. The method of claim 2, wherein each respective convolution is performed numerically in the time domain.

4. The method of claim 2, wherein each convolution corresponds to a respective linear filter, and each respective convolution is performed numerically by evaluating the corresponding linear filter in the frequency domain.

5. The method of claim 2, wherein:

the series has two or more of the stages; and in each stage, the generating of each of the perturbation terms in a stream of perturbation terms comprises forming a weighted sum of a set of N terms from the input stream of hard data symbols respective to that stage, N being a predetermined positive integer; and the respective sets of N terms used in the two or more of the stages are independent of each other.

6. The method of claim 1, wherein:

an ultimate of the one or more stages directs a stream of the compensated soft data symbols to a decoder; and the method further comprises, in the decoder, decoding said directed stream.

7. The method of claim 1, wherein the using of the perturbation terms to compensate respective ones of the soft data symbols comprises:

advancing at least some of the perturbation terms to a soft-decision FEC decoder; and in the soft-decision FEC decoder, using the advanced at least some of the perturbation terms to perform soft-decision compensation of at least some of the soft data symbols.

8. An apparatus, comprising:

a digital signal processor, comprising one or more Perturbation-based Nonlinearity Compensator (PNC) stages, to perform perturbation-based optical nonlinearity compensation of measurements of an optical data signal in an optical receiver, wherein each PNC stage comprises:

a circuit configured to convert a stream of soft data symbols to a stream of hard data symbols; and a PNC circuit configured to generate a stream of perturbation terms from the hard data symbols, the PNC circuit being configured to generate each individual one of the perturbation terms as a weighted sum of the hard data symbols; and wherein the digital signal processor further comprises at least one circuit configured to compensate individual ones of the soft data symbols using corresponding ones of the perturbation terms, wherein the digital signal processor comprises a series of the PNC stages and wherein each stage is configured to evaluate a different nonlinear contribution and to apply the evaluated different nonlinear contribution to the input stream of soft data symbols, wherein the PNC circuit in each PNC stage is configured to subtract individual ones of the perturbation terms from respective ones of the soft data symbols to generate corrected soft data symbols;

the PNC circuit in each PNC stage except a last PNC stage of the series is configured to output the corrected soft data symbols therefrom to a next PNC stage of the series; and the PNC circuit of the last PNC stage of the series is configured to output the corrected soft data symbols therefrom to a decoder.

9. The apparatus of claim 8, wherein:

the PNC circuit in each PNC stage is configured conformed to perform a convolution between a set of channel coefficients and a set of multiplicative products of hard data symbols to generate weight coefficients; and the channel coefficients represent nonlinear effects in an optical transmission channel.

10. The apparatus of claim 8, wherein the PNC circuit in each PNC stage is configured to perform the convolution numerically by evaluating a corresponding linear filter in the frequency domain.

11. The apparatus of claim 9, wherein:

the series comprises two or more of the PNC stages; and the PNC circuit in each PNC stage is configured to form each of its respective weighted sums from a set of N terms selected from a stream of hard data symbols, N being a predetermined positive integer; and the sets of N terms used by the respective PNC stages are independent of each other.

12. The apparatus of claim 8, wherein:

the digital signal processor further comprises a soft-decision FEC decoder;

the PNC circuit of a last of the one or more PNC stages is configured to output a stream of soft data symbols and a stream of perturbation terms to the soft-decision FEC decoder; and the soft-decision FEC decoder is configured to use the outputted perturbation terms to perform soft-decision compensation of the outputted soft data symbols.

* * * * *